(12) United States Patent
Tovar

(10) Patent No.: US 9,191,393 B2
(45) Date of Patent: Nov. 17, 2015

(54) INTERNET MEDIATION

(75) Inventor: Tom C. Tovar, San Francisco, CA (US)

(73) Assignee: Nominum, Inc., Redwood City, CA (US)

( * ) Notice: Subject to any disclaimer, the term of this patent is extended or adjusted under 35 U.S.C. 154(b) by 617 days.

(21) Appl. No.: 12/727,001

(22) Filed: Mar. 18, 2010

(65) Prior Publication Data

US 2011/0231927 A1    Sep. 22, 2011

(51) Int. Cl.
*H04L 29/06* (2006.01)
*G06F 21/30* (2013.01)
*G06Q 30/06* (2012.01)

(52) U.S. Cl.
CPC ............ *H04L 63/102* (2013.01); *G06F 21/305* (2013.01); *G06Q 30/06* (2013.01); *H04L 63/0263* (2013.01); *G06F 2221/2115* (2013.01); *G06F 2221/2119* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 6,233,618 B1 * | 5/2001 | Shannon | ........................ | 709/229 |
| 6,336,117 B1 * | 1/2002 | Massarani | ...................... | 707/711 |
| 2002/0169865 A1 * | 11/2002 | Tarnoff | ......................... | 709/223 |
| 2003/0014659 A1 * | 1/2003 | Zhu | ................................ | 713/200 |
| 2003/0028622 A1 * | 2/2003 | Inoue et al. | ................... | 709/219 |
| 2003/0065942 A1 * | 4/2003 | Lineman et al. | .............. | 713/201 |
| 2003/0123465 A1 * | 7/2003 | Donahue | ....................... | 370/401 |
| 2003/0200442 A1 * | 10/2003 | Bhat et al. | ..................... | 713/182 |
| 2005/0022229 A1 * | 1/2005 | Gabriel et al. | .................. | 725/28 |
| 2005/0277445 A1 | 12/2005 | Bae | | |
| 2006/0173793 A1 * | 8/2006 | Glass | .............................. | 705/75 |
| 2007/0118669 A1 * | 5/2007 | Rand et al. | .................... | 709/245 |
| 2007/0220145 A1 | 9/2007 | Kozakura et al. | | |
| 2008/0209057 A1 * | 8/2008 | Martini et al. | ................ | 709/229 |
| 2009/0100513 A1 * | 4/2009 | Coburn | .......................... | 726/11 |
| 2009/0164597 A1 * | 6/2009 | Shuster | ......................... | 709/206 |
| 2010/0154024 A1 * | 6/2010 | Boxmeyer et al. | ................ | 726/1 |

OTHER PUBLICATIONS

"Why does the token URL has not been whitelisted message display when trying to signup or log in?", Retrieved: Feb. 9, 2015, Published: Nov. 11, 2010, URL: https://getsatisfaction.com/getsatisfaction/topics/why_does_the_token_url_has_not_been_whitelisted_message_display_when_trying_to_signup_or_log_in.

* cited by examiner

*Primary Examiner* — David Pearson
(74) *Attorney, Agent, or Firm* — Carr & Ferrell LLP

(57) ABSTRACT

Systems and methods for a user to personalize Internet content from an Internet service provider using selected policy applications. The policy applications may be discrete, single purpose applications. The system may be controlled from home gateways and remote devices.

47 Claims, 12 Drawing Sheets

FIG. 9 myi

Take control of your internet                    Already a Member?

Username:    Password: [    ] GO

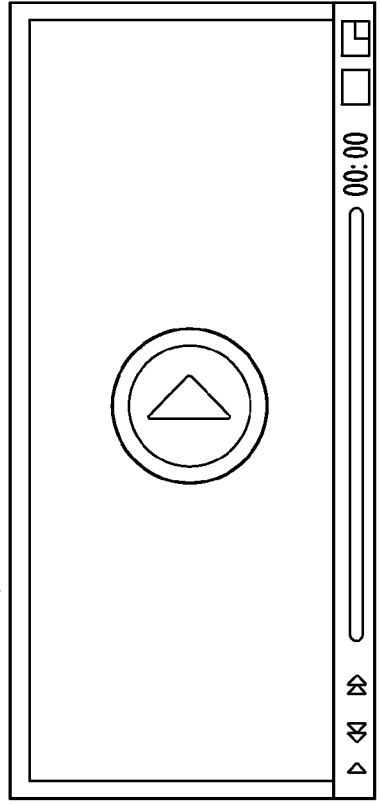

myi comes with pre-selected apps just for you!

BEDTIME
Lorem ipsum dolor sit amet, con sectetur adip scing

SAFESURF
Lorem ipsum dolor sit amet, con sectetur adip scing

BABYSITTER
Lorem ipsum dolor sit amet, con sectetur adip scing

Get More Apps When You Sign In!

[ Take Me To The App Store ]

What our customers are saying...

"Lorem ipsum dolor sit amet, consectetur adipiscing elit. Fusce adipiscing luctus mi, feugiat vulputate velit suscipit."
— John Smith, San Diego, CA "Lorem ipsum dolor sit amet, consectetur adipiscing elit. Fusce adipiscing luctus mi, feugiat vulputate velit suscipit."
— John Smith, San Diego, CA More ▷

---

We give you more control of the Internet...

Me
Myi's "me" apps are Dedicated to You and Your Lifestyle! You decide what is Important to you and on how you want to use the Internet! Now's your chance to Create an Internet that best suits you!

My Home
The Internet is a Gateway to the world that Sits in Your Home, so shouldn't you decide the rules to apply to it? Myi's "my home" apps let you have the power to Decide what can come in, what can go out, and what hours all of this can take place on the Internet. The Internet is a guest in your home after all!

My Kids
As the parent, You Set the Rules, not what search engines and browsers can deliver to your children's eyeballs. Myi understands that every household has a unique set of rules, so you tell us how you want your kids to use the Internet. You're the Boss!

myi

My Internet

Home | My Account | My Settings | Help & FAQ | ⏻ Logout

Share Settings

Store    View All

ME
Improve your interactions with the internet
Most Popular/Recently Added

Boycott    Our Time    Don't Forget

MY HOME
Keep the unwanted from your home internet
Most Popular/Recently Added Household..    Vaccine    Imposter

MY KIDS
Your child and the internet
Most Popular/Recently Added

Bedtime    Busted    Grounded

First Things First ▷

Alerts

| Date/Time | Category | Description | Actions |
|---|---|---|---|
| ⊗ Today, 4:15PM | Bedtime | Lorem ipsum dolor sit | Configure |
| ⊗ Yesterday, 1:01PM | Our Time | Lorem ipsum dolor sit | Remove |
| ⊗ Jan, 21, 11:04PM | Study Hall | Lorem ipsum dolor sit | Configure |
| ⊘ Jan 19, 9:14PM | Vaccine | Lorem ipsum dolor sit | Configure |

INTERNET MEDIATION

BACKGROUND OF THE INVENTION

1. Field of the Invention

The present invention relates generally to the provision of Internet service. The invention relates more particularly to a system in which an end user to mediate his Internet service by exercising control over the access privileges, usage, content and other aspect of Internet use across his household network.

2. Background Art

Since the Internet was launched in 1995, online services have emerged for many consumer and business needs and applications. The power of the Internet has been attributed to its unique properties as a global, two-way medium that allows any user the ability to reach global users or businesses and interact with them, literally at the speed of light. The term "globalization" has become the new order of the economic day, powerfully enabled by the Internet, which has caused massive shifts and transformations in how consumers and businesses conduct their day-to-day personal and commercial business.

In today's "information age" people frequently perform various types of searches using computing devices connected to the Internet. The Internet has made searching for information far more simple than using manual techniques, which typically involve going to a library and searching through various indexes to find articles or books, for example. To perform a computerized search, a searcher simply enters a word or words (termed "keywords") into a website query box in order to find information related to the entered words. Searching on the Internet has become so ubiquitous that Internet use is really no longer about searching, but rather about actually connecting with services that are suited to the needs of the user.

The success of the Internet has rested primarily on its ability to make information immediately available to and accessible by all. In early Internet applications, information came in the form of news and other information services delivered directly to end users. Later, many applications evolved into information exchanges, community-based sharing services, and eventually, to social networking and related applications.

In the early to middle part of the Internet expansion, search engines were the tool of choice for Internet users. In the absence of other mediums, search engines addressed the simple but profound human desire to explore and discover the expanding set of information available on the Internet. Today, search engines still play an important role. However, other mediums like social networking sites and apps on mobile devices have gained ground as the primary means for users to participate in today's Internet society.

In today's Internet, "sharing" is quickly replacing "exploring" as the primary Internet use case. Likewise, "individualization" (through self-selection) has begun to demand an equal place with "personalization" (intent based systems) in the informational hierarchy for end users. Against this backdrop, the search engine no longer dominates the end user mindset and is slowly becoming the tool of last resort for Internet users.

Today's Internet users are increasingly adopting platforms and services that allow a self-selected Internet experience as the primary means of access. A good example of this phenomenon would be the meteoric rise of social networking sites (e.g. Facebook and Twitter) and other web sites that allow selective, sophisticated and granular sharing (e.g. Flickr) among user groups and sub-groups. This new trend is not limited to the fixed line or home experience.

A prime example is the enthusiastic adoption by the public of Smartphones. Smartphones have transformed the mobile phone into a highly intuitive, easy to use, easy to individualize, device for an average consumer. Users may check and update their status on the go, use a variety of apps to access the informational warehouses on the Internet at their whim, link and share with other users, and control other applications. Each of these uses increases the Internet's impact on the daily lives of the users. Smartphone outlets allow users to self-select applications that serve their individual whims, from the frivolous to the informative. With all these new tools at their disposal, users can experience the Internet in a discrete, self-serve and transactional manner, separated from the need to rely on search engines as the primary discovery and access medium for the information available on the Internet.

With all its benefits, the Internet also has an unproductive and, in cases, destructive side. In fact, navigating, managing, and mediating the sometimes intrusive nature of the Internet is a challenge for every user. The challenge exists because of the ubiquitous nature of the Internet and the profound impact of the Internet on social interaction. Some of the inherent challenges of the Internet are listed in the following paragraphs.

The Internet has inherent duality. On the one hand, the Internet has vast positive value for users; on the other hand, it has an equal range of threats like malware—, phishing, virus etc. Most users today remain unprotected by client based (or network based solutions).

The Internet has become a utility class service that is founded on easy and immediately available information. However, other than "pulling the plug" there is no way to control the flow of information from the Internet, both good and bad. Not all Internet content is worthy of or appropriate for all users all the time. The complexity of household use in cases involving multiple users of different ages and levels of sophistication and maturity have not been adequately addressed in the prior art.

Examples of the shortcomings in the prior art are found in software packages that control the content displayed on the computers in a home. The packages will typically include no mechanism to manage other access devices, such as Smartphones, that may be available to members of the household that should be subject to policy enforcement. Therefore controlling content only at the computer level may accomplish little more than piquing the curiosity of certain users (children for instance). Accordingly, there is a need for a system which enables users to more effectively personalize the content of the Internet service they receive.

SUMMARY OF THE INVENTION

Various embodiments of the present invention provide systems and methods for personalizing the content of Internet service delivered to the home or business of the end user. The system may provide policies that guide various user queries. Various embodiments of the system and method include policy modules for malicious site addresses, sites designated by the users, non-existent addresses, and data collection and analysis.

The system may include a user interface that allows the end user to personalize the content, and conditions of use, of the Internet service delivered. The user interface operates between an end user and an Internet service provider. For purposes of this disclosure, the definition of Internet service provider will include any service or technology that provides a connection to the Internet. Examples of such technologies include, but are not limited to, traditional Internet service providers (ISPs), telecommunications companies, cable operators, mobile operators, network operators and any other provider of wired or wireless access to Internet services. The system may be set up to run to utilize a DNS (Domain Name System) server or a cloud based networking system.

The system includes one or more policy applications that allow a user to selectively manage at least a portion of an Internet service received by that end user or home network. The policy applications may be discrete applications and may be single purpose applications. The applications may be configured to meet the needs, rules and behaviors desired by the end user. The user may select one or more policy applications from a selection menu to provide an individualized Internet experience for the end user or his household.

The end user selects the policy applications that he wants to apply to his Internet service. The selections are made using at least one of the Internet access devices available to the user and the user interface. The policies contained in the policy applications are applied to the Internet service that is supplied to the end user. Policies may include specific sites that can or cannot be accessed. Policies may also include time and duration of access, and limitations and restrictions specific to a given user or to the home network generally. It should be noted that the policy applications may be used to not only prohibit undesired behaviors, but may also be used to encourage desired behaviors. Other users within a home network may be redirected to sites other than those chosen based on a policy application applied by the user.

Feedback about the Internet service may be made available to the end user, such as to a person designated as the administrator of the system. The feedback may include a listing of sites that are accessed, access attempts for sites that are blocked, duration and time of use of each site, and which access device was used to access each site. The feedback may further include identification of the specific user who accessed the Internet.

Information about the personalization settings of an end user may be shared with third parties. A user may publish to friends or other third parties the policy applications they are using, and/or which policies he has in place. Similarly, the user may access information from third parties, such as which policies they are using, which policy applications they find useful, etc.

The user interface may be accessed through a gateway available to the user. Gateways include but are not limited to desktops, PCs, laptops, notebooks, game consoles (e.g., an X-box), IPods, IPhones and Internet enabled TVs. The system may also be accessed and controlled through remote control means, such as a Smartphone. A Smartphone may be generally defined as a phone with computing capability. A Smartphone may provide Internet access to a user.

BRIEF DESCRIPTION OF THE DRAWINGS

FIG. 9 is a screenshot of a selection menu that may be used in the system.

FIG. 10 is a screenshot showing the use of a particular policy application.

Figure 11:
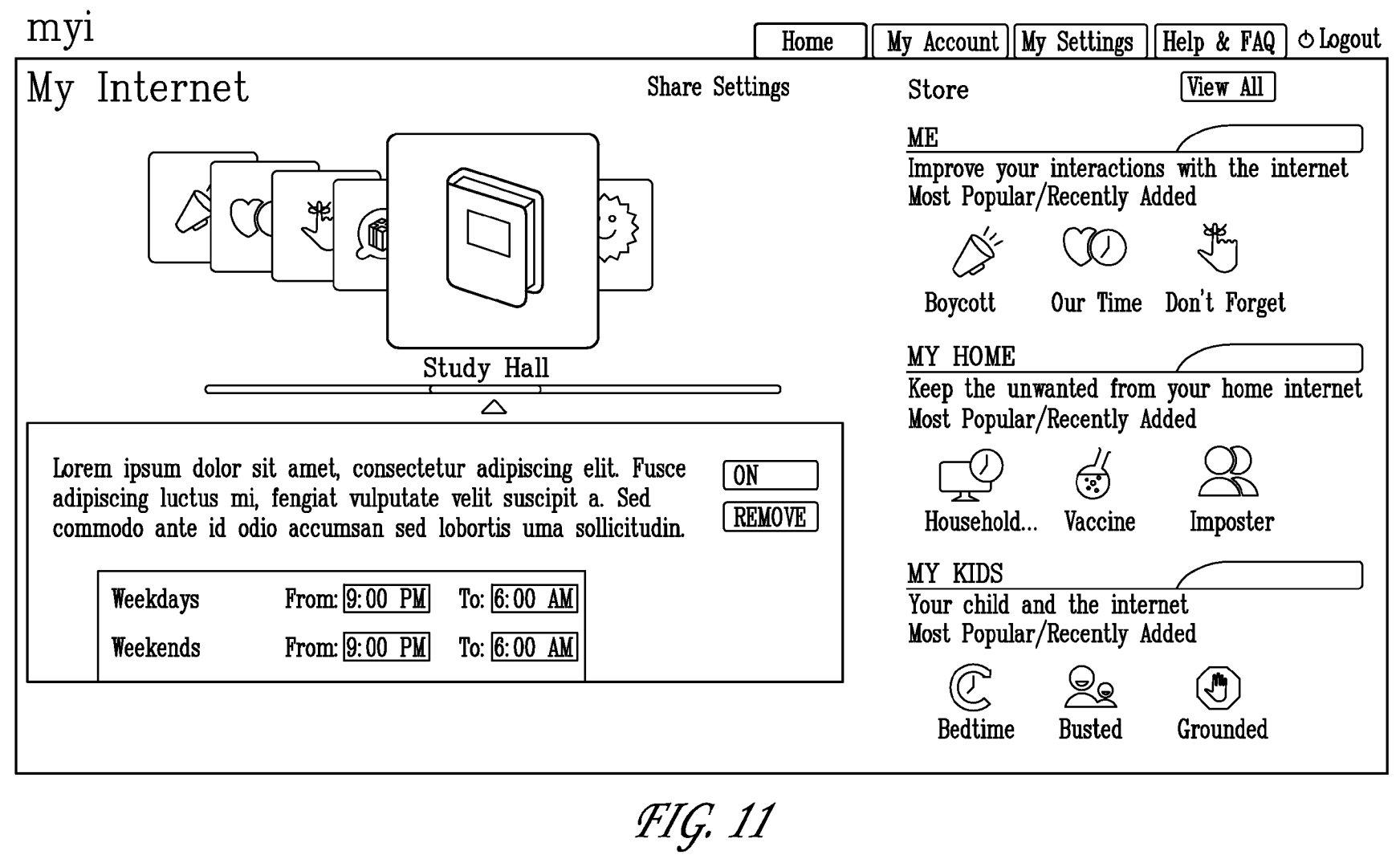

FIG. 11 is a screenshot showing the use of another policy application.

Figure 12:
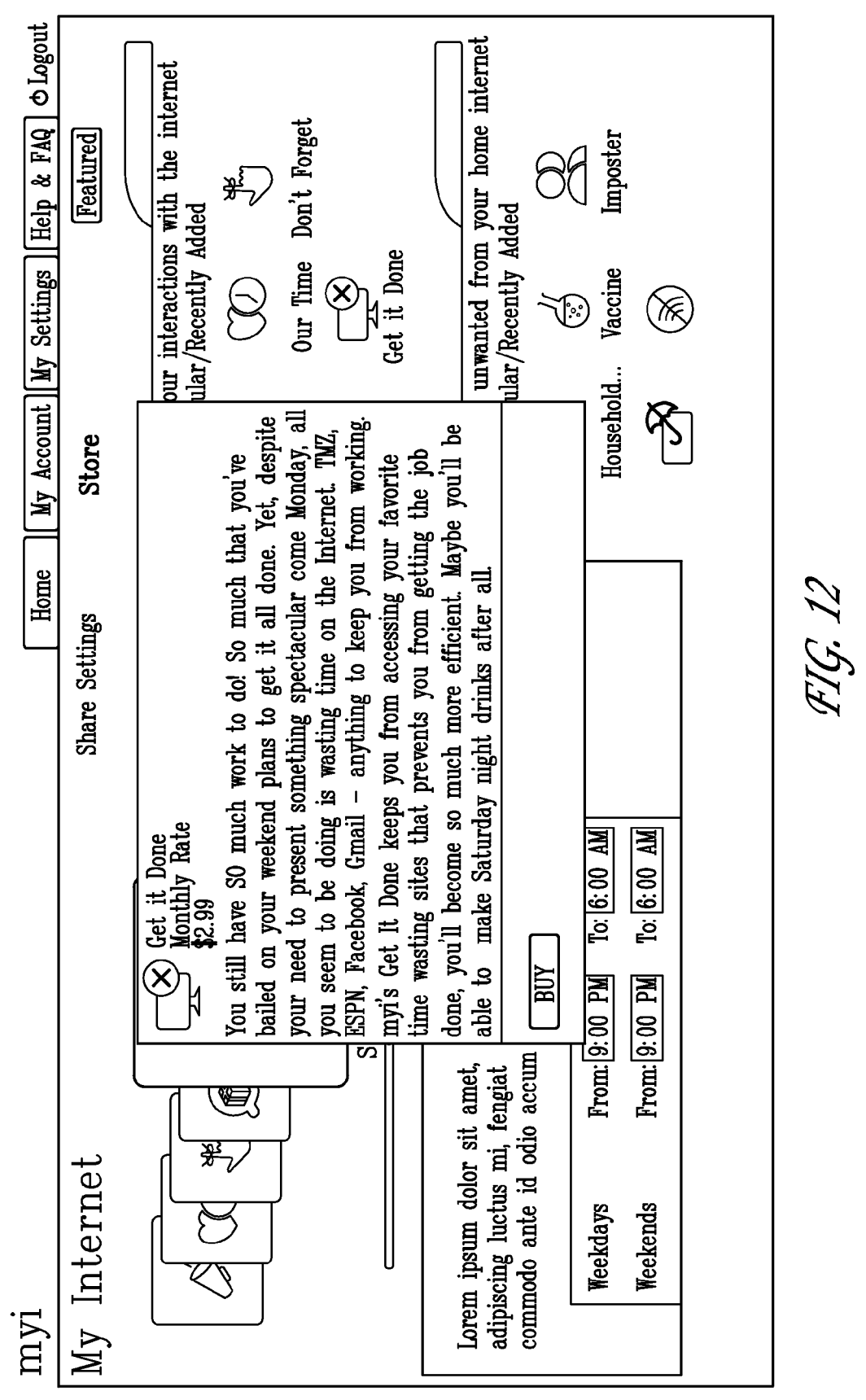

FIG. 12 is a screenshot showing the use of another policy application.

DETAILED DESCRIPTION

Various embodiments of the present invention provide a method and system of individualizing the Internet experience. The system includes a user interface that allows the end user to establish a unique rule set for access privileges, desired usage, and the content delivered though his Internet service. The system applies several discrete policy applications selected by the end user to the Internet service. Using the system interface, the user selects the policy applications that most closely relate to his beliefs and household rules for Internet use and content. The policy applications designate which sites may or may not be accessed, and/or limit times of access and durations of use for various end users.

Figure 1:
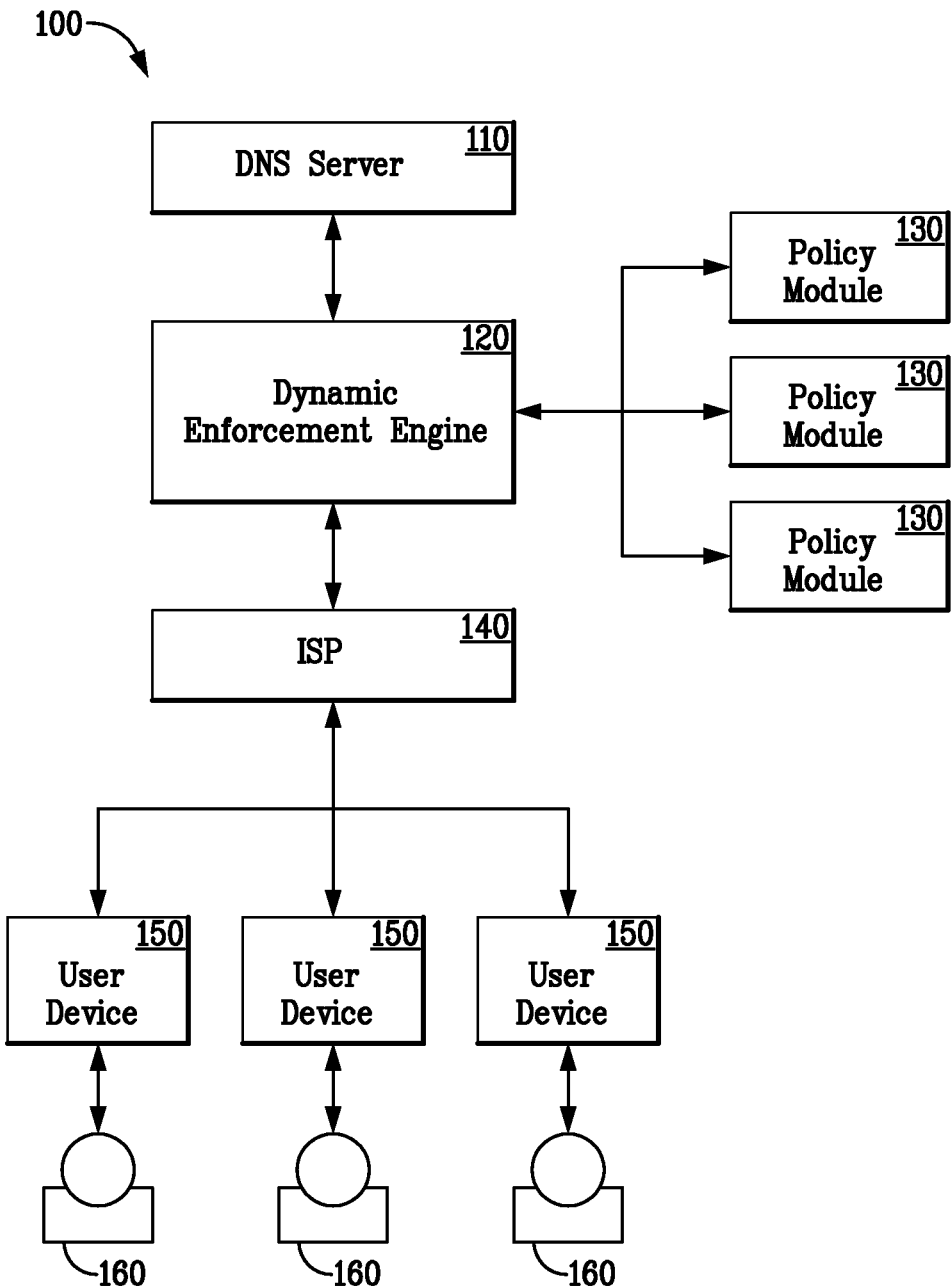
FIG. 1 is a schematic diagram of a DNS server arrangement.

FIG. 1 illustrates a system 100 for supplying Internet service according to the present invention. A DNS server 110 operates in conjunction with a dynamic enforcement engine 120. The dynamic enforcement engine 120 may operate in conjunction with one or more policy modules 130 to establish any applicable polices at the DNS 110 level. The content rules are applied to received user queries, and determine the content that is delivered by the DNS network 140 (also referred to as internet service provider 140 herein) through various user devices 150 to the end users 160.

The dynamic enforcement engine 120 may generate its policy engine on instructions received from one or more policy modules 130. Each policy module 130 may be constructed to provide various types and levels of services to the DNS network 140. In various embodiments, a policy module 130 may be configured to handle queries directed to subjects including, but not limited to, malicious domain redirection, user access redirection, non-existent domain redirection, and data collection or analysis.

A policy module 130 that is configured to redirect queries from malicious domains may determine categories of queries that require special handling. The determination to redirect a query may be triggered by multiple methods. The determination may be made automatically from Internet activity (via zone transfers). The determination may also be made from manually specified lists and from server configuration statements. An example of this configuration would be in jurisdictions in which a DNS network 140 is required to intercept queries to certain pornographic sites. In this situation, the policy module 130 intercepts the query and redirects the user to another site.

In a policy module 130 configured for user access redirection, the policy module 130 may redirect a specified set of users to specific views. The specific views are used to provide information pertinent to the specified set of users. Some examples of actions of the policy module 130 in this configuration are notification to users regarding viruses, billing issues, or other matters of particular interest to the specified set of users.

A policy module 130 configured to redirect queries for non-existent domains redirects erroneous queries to selected sites. The policy module 130 in this configuration may attempt to ascertain the intent of the query rather than simply return an error message. Some instances of erroneous queries are fairly easy to detect. Close misspellings may be redirected to the intended address. If the general subject matter of a query can be determined, the user may be sent to an address relative to that subject. Conversely, certain users may choose to never be redirected in response to a non-existent domain request. The system 100 identifies those users, and the policy module 130 simply returns a non-existent domain response to any erroneous query.

The use of the policy modules 130 to control and modify the dynamic enforcement engine 120 in the system 100 provides an effective means of establishing policy protocol at a system level. However, in many instances, the end users 160 may have specific needs for their service that may not be addressed by the general policy protocol. It is therefore desirable to implement a system in which the end user 160 can directly control the content of the Internet service he receives.

Figure 2:
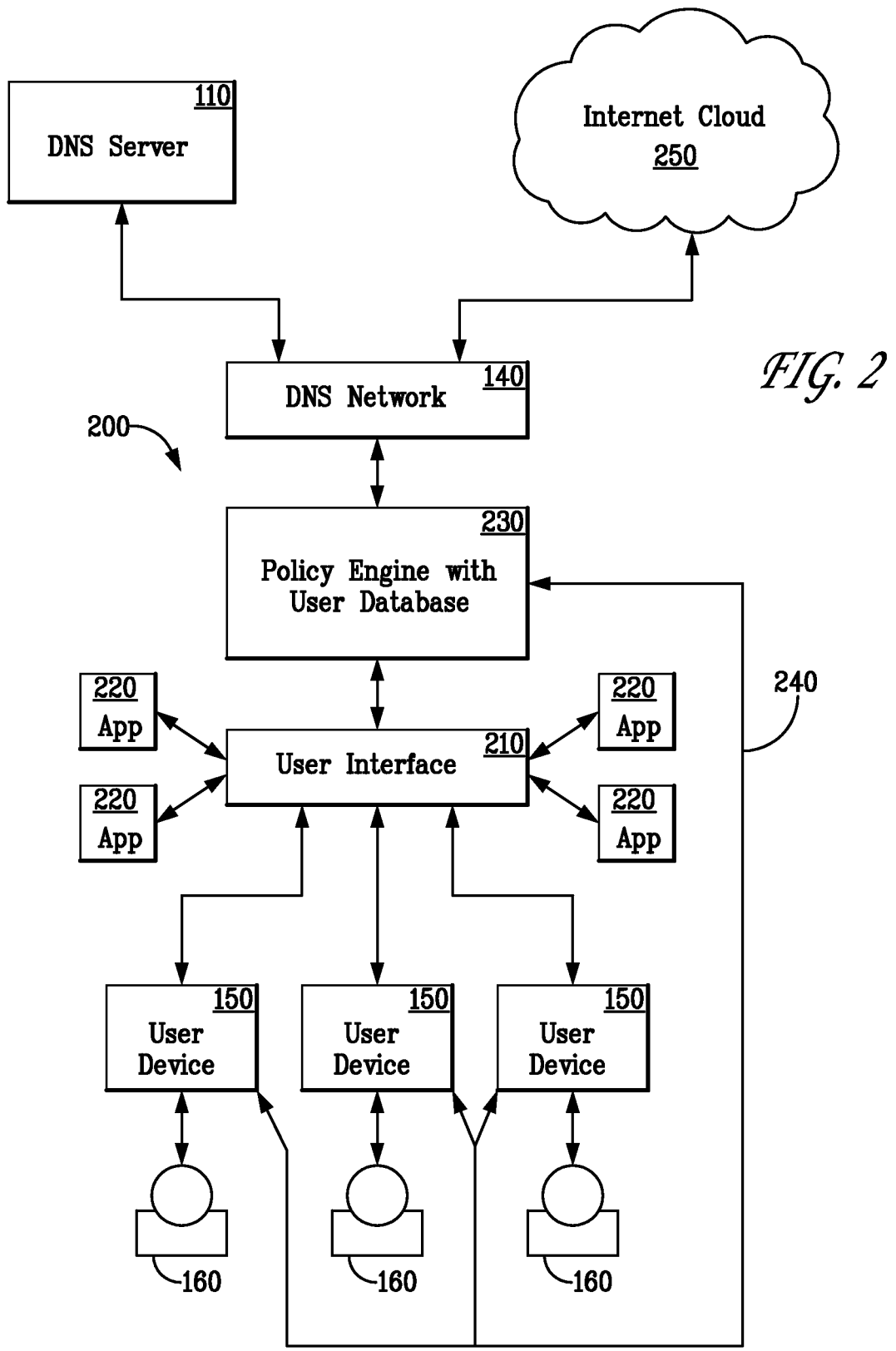
FIG. 2 is a schematic of an exemplary system for providing variable content control for Internet users.

FIG. 2 shows a schematic layout of an exemplary system 200 for implementing direct and variable end user control. FIG. 2 illustrates that the system 200 may operate installed on a DNS server 110, or with a cloud 250 based installation.

The system 200 utilizes a user interface 210. The user interface 210 may be implemented in many embodiments. One specific implementation of the user interface 210 is as a web page.

The user interface 210 may be accessed by one or more user devices 150 operated by the users 160. The user interface 210 may be accessed through a gateway user device 150 available to the users 160. Suitable user devices 150 include but are not limited to desktops, PCs, laptops, notebooks, Xboxes, IPods, IPhones and Internet enabled TVs. The system 200 may also be accessed and controlled through remote control user devices 150, such as a Smartphone. A Smartphone may be defined as a phone with computing capability. A Smartphone may provide the user 160 with Internet access.

The user interface 210 provides a mechanism for one or more authorized users 160 to establish content policy for the Internet service. The user interface 210 operates between the user devices 150 present in the system 200 and the internet service provider 140. Instructions resident on the user interface 210 therefore operate on the Internet service, by controlling at least a portion of DNS resolutions via a dynamic policy engine 230, before the service reaches the displays of the user devices 150.

The user interface 210 provides the users 160 with access to one or more policy applications 220. The user interface 210 may provide access to a selection list to at least one authorized user 160. The authorized user 160 uses the selection list or some other menu mechanism to select those policy applications 220 that the user 160 chooses to apply to the system 200. The authorized user 160 may select any number of the available policy applications for use on the system 200 at any given time. In implementations utilizing Smartphones as the user device 150, the policy applications 220 are downloaded to the device 150. The device 150 then serves as the user interface 210 to communicate directly with the dynamic policy engine 230.

The policy applications 220 may prohibit access to specific sites. The policy applications 220 may also limit the time of day when users or selected users 160 may access certain sites. The policy applications 220 may also manage and analyze duration of access to various sites. It is important to note that the policy applications 220 do not simply provide blocking mechanisms by masking or enabling network controls, but rather mediate an Internet service received by the end user. As used herein, mediating the service may include any of blocking, constraining, enabling, redirecting, promoting, demoting, substituting, obscuring, limiting, interrupting, and restricting all or a portion of the Internet service. The policy applications 220 may provide notifications or alerts to one or more users 160 when sites are accessed. The policy applications 220 may also provide notification of frequency and duration of access of designated sites. The policy applications 220 may also be used to observe, substitute, enable, redirect users, to reward behavior desired from the users by a system administrator, etc. The policy applications 220 may redirect users from a non-favored site to another site. The policy applications 220 may also collect and transmit data characteristic of Internet use.

Access policies supplied by the policy applications 220 may apply to all users 160 of the system 200, or the access policies may be specific to individual users 160. The policy applications 220 may be discrete, single purpose applications, and are discussed in further detail below with reference to FIGS. 5-8.

The policy applications 220 provide the users 160 with a mechanism to take various actions relative to their Internet service feed. The policy applications 220 also allow the users 160 to establish a dynamic policy engine 230 that includes a user database. The policy engine 230 is used to enforce rules associated with each policy application associated with individual end users, not simply block various inappropriate sites from the Internet feed. Rather, the dynamic policy engine 230, controlled by the user interface 210 through user device(s) 150, is used to manage all aspects of the Internet experience for the users 160. In sum, the policy applications 220 may be used to configure the dynamic policy engine 230 to provide the users 160 with a mechanism to personalize the Internet experience. The policy applications 220 may be configured in combinations, and may each be separately configured.

The database in the policy engine 230 may be used to record and to notify users 160 of various data relative to Internet access. The data collected from and provided to the users 160 may include records of access of specific sites, time spent on specific sites, time of day of access, data specific to individual users, etc.

It should also be noted that following an initial setup through the user interface 210 of the policy engine 230, a direct access 240 enforcement loop may be established between the policy engine 230 and the user devices 150. Subsequent accessing of the DNS network 140 utilizing the direct access 240 decreases response time in the system 200, thereby further enhancing the Internet experience of the users 160. Configurations of policy applications 220 that are selected by one or more users 160 designated as system administrators may remain in the user database of the policy engine 230 until such time as it may be modified by the system administrators. The system administrators may define multiple policy configurations, with a combination of policy applications 220, applicable to one or more end users 160 of the system 200. Each policy application 220 may be separately configurable as well. Policy configurations may vary based upon designated times, conditional triggers, or specific requests from the users 160 with administrative authority.

As indicated above, two discrete data flow paths may be established for the system 200. A first data path establishes a set of enforcement policies for the system 200. The first data path flows from at least one user device 150 through the user interface 210, to the policy enforcement engine 230. A second data path 240 may be utilized following the establishment of a set of policies for the system 200. The second data path 240 flows directly between the user device(s) 150 and the policy engine 230. Multiple sets of enforcement policies may be established and saved within the system 200 and implemented selectively by the users 160.

Figure 3:
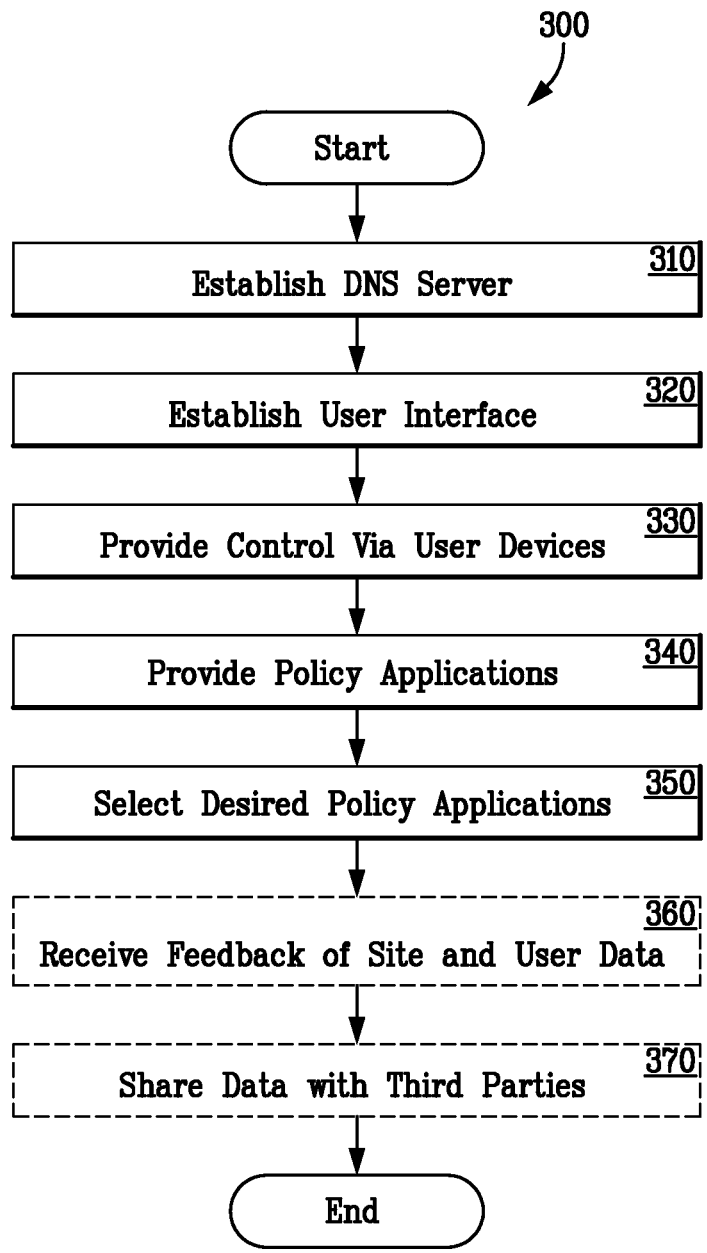
FIG. 3 illustrates an exemplary method of providing variable content control to Internet users.

FIG. 3 is a flowchart of an exemplary method 300 for personalizing the content of Internet service. A foundational step 310 of the method 300 is the establishment of the DNS server 110. With the DNS server 110 in place, a further step 320 is the establishment of the user interface 210. A further step 330 of the method 300 is providing control of the method through user devices 150. As described above, the user devices 150 may be various computing devices. If remote control of the method is desired, a portable computing device such as a Smartphone may be utilized as the control device. In this scenario, operating applications may reside on the user device 150.

The method 300 further includes the step 340 of providing one or more policy applications 220. The policy applications 220 may be discrete, single purpose applications. Using single purpose policy applications 220 may make the applications more straightforward and easier for the end users 160 to operate.

In a selection step 350, at least one authorized user 160 selects which policy applications 220 will be applied. In the selection step 350, the authorized user 160 establishes the policy protocol for the system in which the method 300 is employed. During the selection step 350, the authorized user 160 determines specific policies applied to each site such as which sites may be accessed and which may be blocked, as well as the parameters for use of available sites. Game or social sites may well be accessible, but the time periods during which they can be accessed and the duration of site visits may be restricted by the method 300.

Various embodiments of the method 300 may include a data collection step 360. In step 360, the method may collect whatever access data is desired. Possible collected data may include but is not limited to use characteristics such as sites visited, number of visits to each site, duration of visits, time of visits, etc. Data may also be collected and catalogued by individual user 160 of the method 300. At least one user 160 may be designated to receive the data collected. The user 160 designated to receive collected data may be the same user authorized to establish the policy protocol of the method 300.

In a sharing step 370, users of the method 300 may share data with third parties. Typical policies shared may be specific sites being blocked, policy applications 220 being used, and other uses and characteristics of the method 300.

Figure 4:
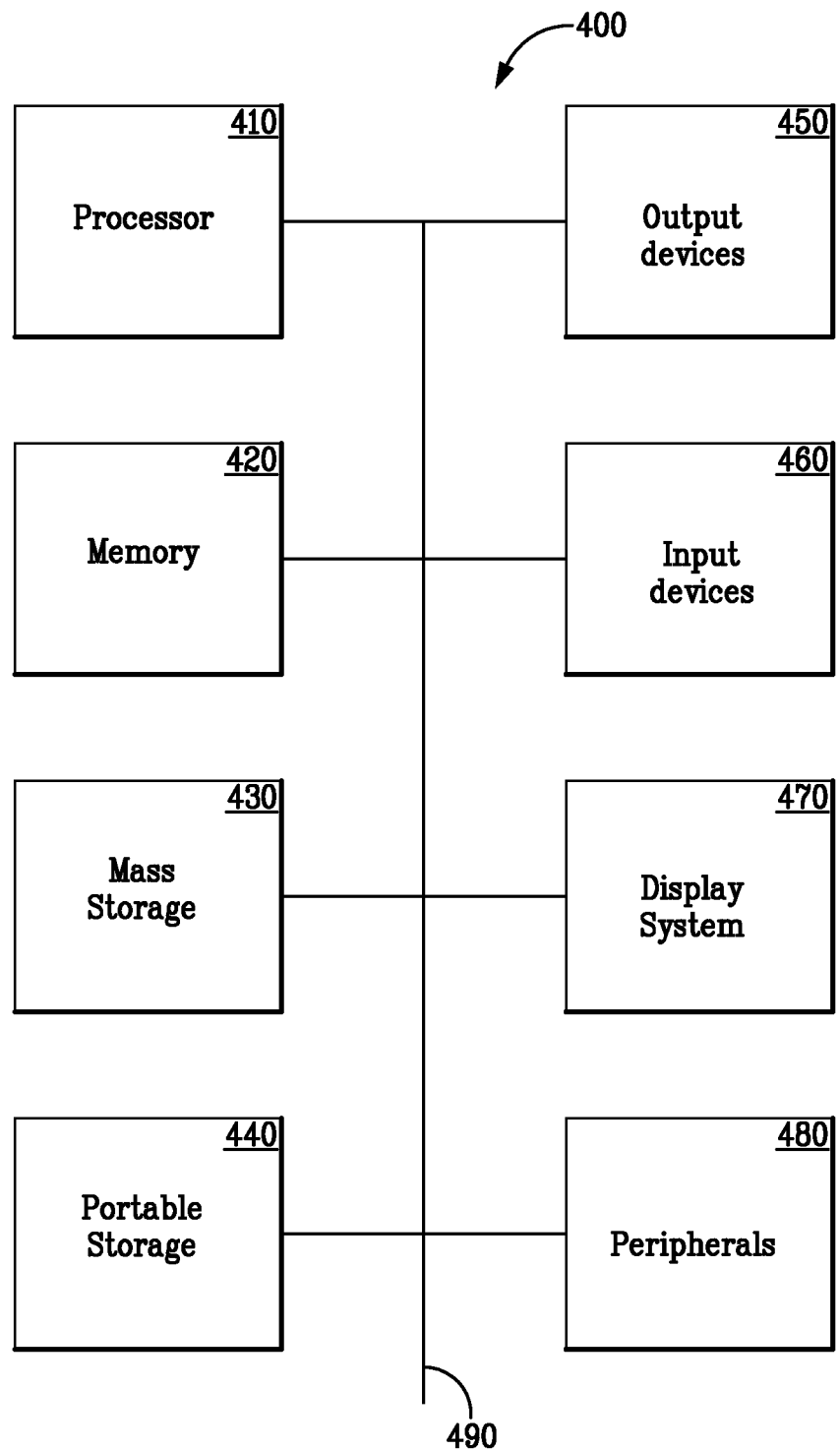
FIG. 4 illustrates an exemplary computing system that may be used to implement the method of the present invention.

FIG. 4 illustrates an exemplary computing system 400 that may be used to implement an embodiment of the present invention. System 400 of FIG. 4 may be implemented in the contexts of the likes of client devices 150, DNS server 110, and Internet cloud 250. The computing system 400 of FIG. 4 includes one or more processors 410 and memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a graphics display 470, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. Peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Figure 5:
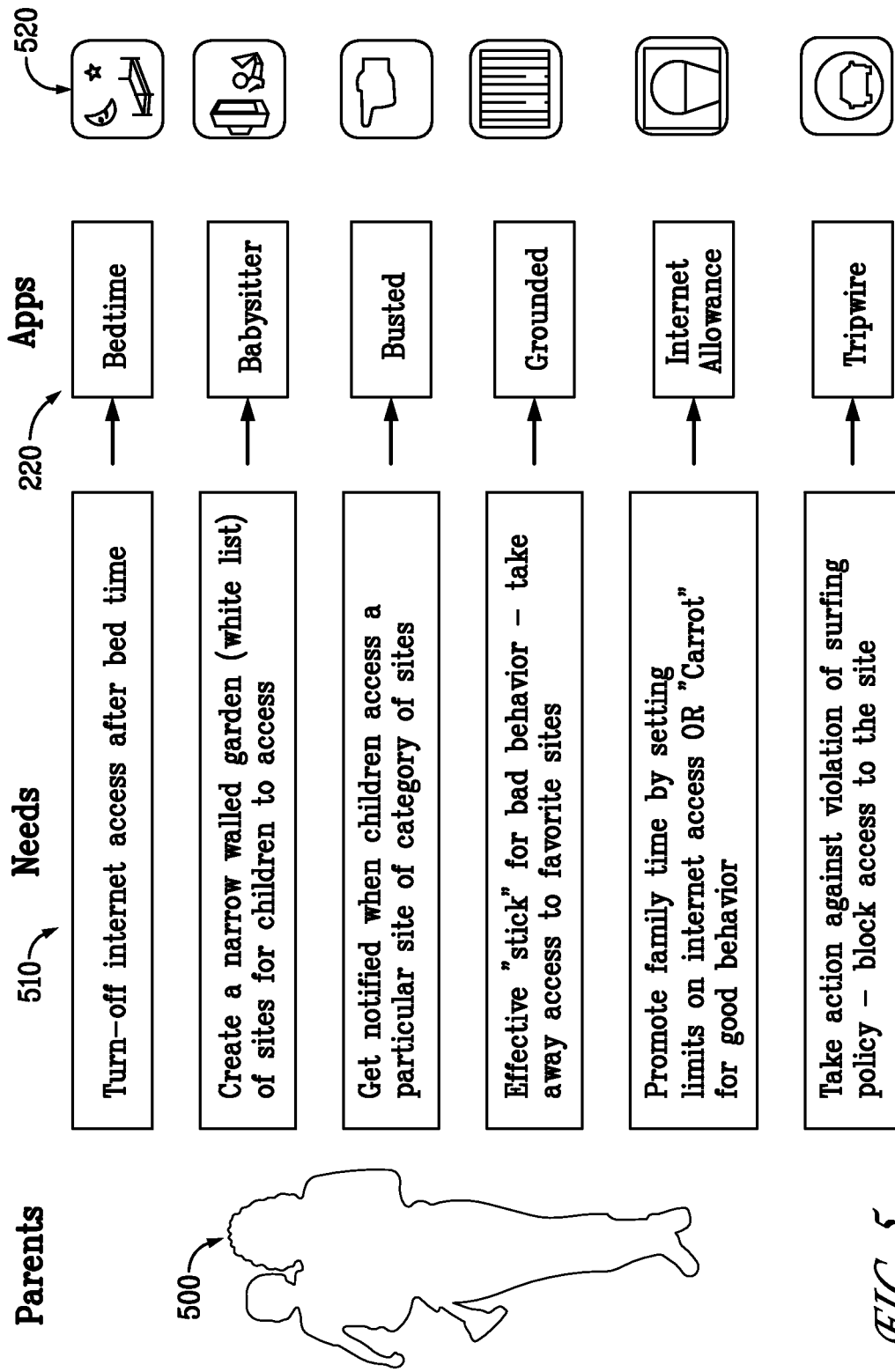
FIG. 5 illustrates representative policy applications that may be suited to parents.

FIG. 5 illustrates how policy applications 220 may be grouped for a particular interest group, in this case parents 500. The various needs 510 of a parent 500 may lead the parent 500 to select certain ones of the policy applications 220. Appropriate names and icons 520 may be associated with each of the policy applications 220.

FIG. 5 shows how the single purpose policy applications 220 may each address a particular need of a user 160. For example, a parent 500 may wish to utilize an application 220 that turns off Internet access after a designated time. The parent 500 may therefore select the appropriate policy application 220, and at least certain users 160 would be denied access after the designated hour. The application selection process may include clicking on the icon 520 that is associated with the selected policy application 220.

Other parent related applications 220 may address parent related needs 510 by providing selections that, e.g., establish an approved list of sites that children may visit, i.e. create a narrow walled garden in which children are allowed to browse, provide notification when a violation of Internet access policy is detected, punish unapproved behavior, allot Internet access time, and provide a mechanism to block access to certain sites that are deemed against the established Internet policy.

Figure 6:
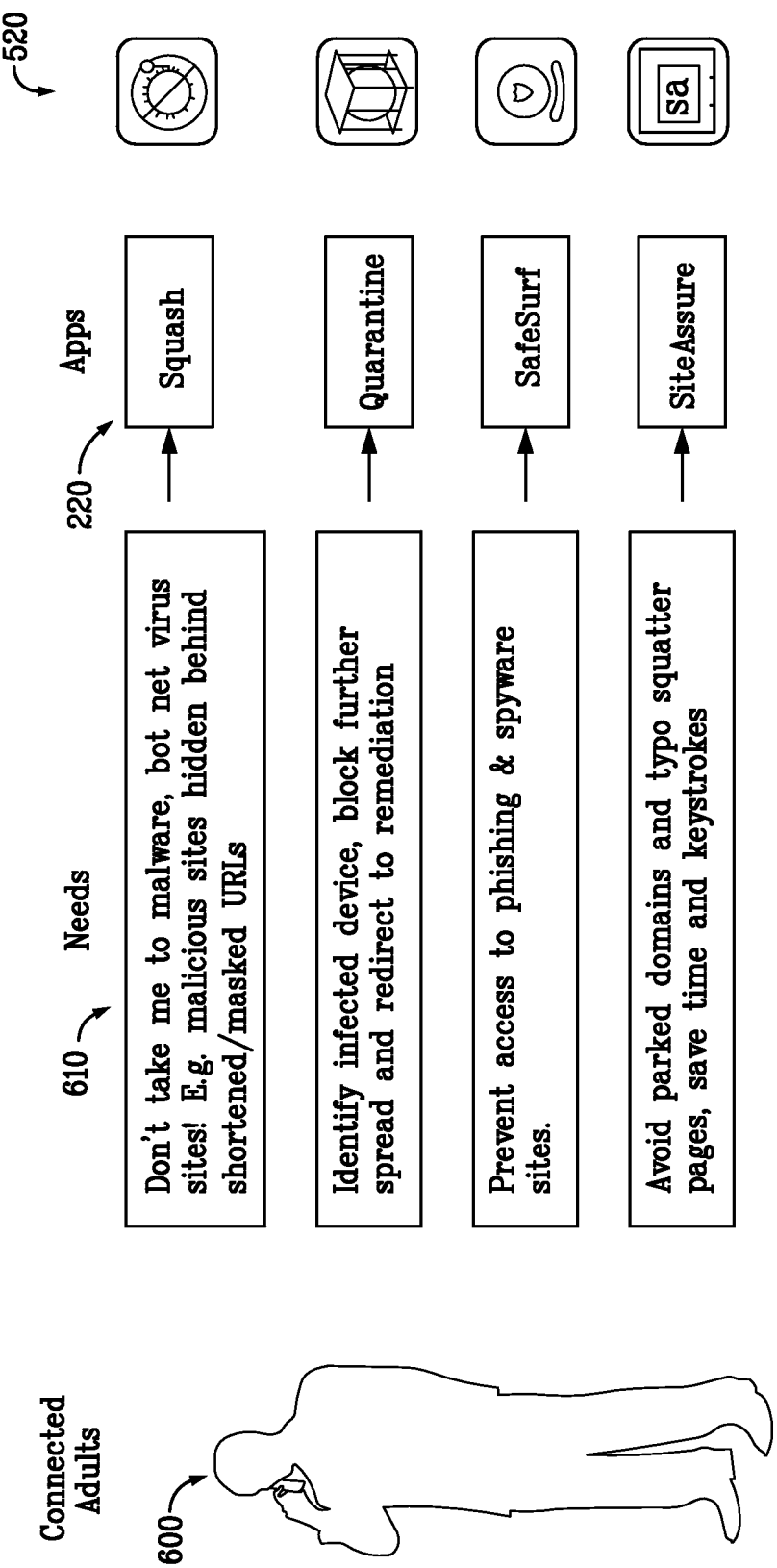
FIG. 6 illustrates representative policy applications that may be suited to connected adults.

Clearly, different social groups will have different needs, and may therefore choose to activate different ones of the policy applications 220. FIG. 6 illustrates that a group such as connected adults 600 may have a different set of needs 610 than parents 500. Connected adults 600 may focus more on defending against malware and the like as opposed to the subject content concerns of parents 500.

Figure 7:
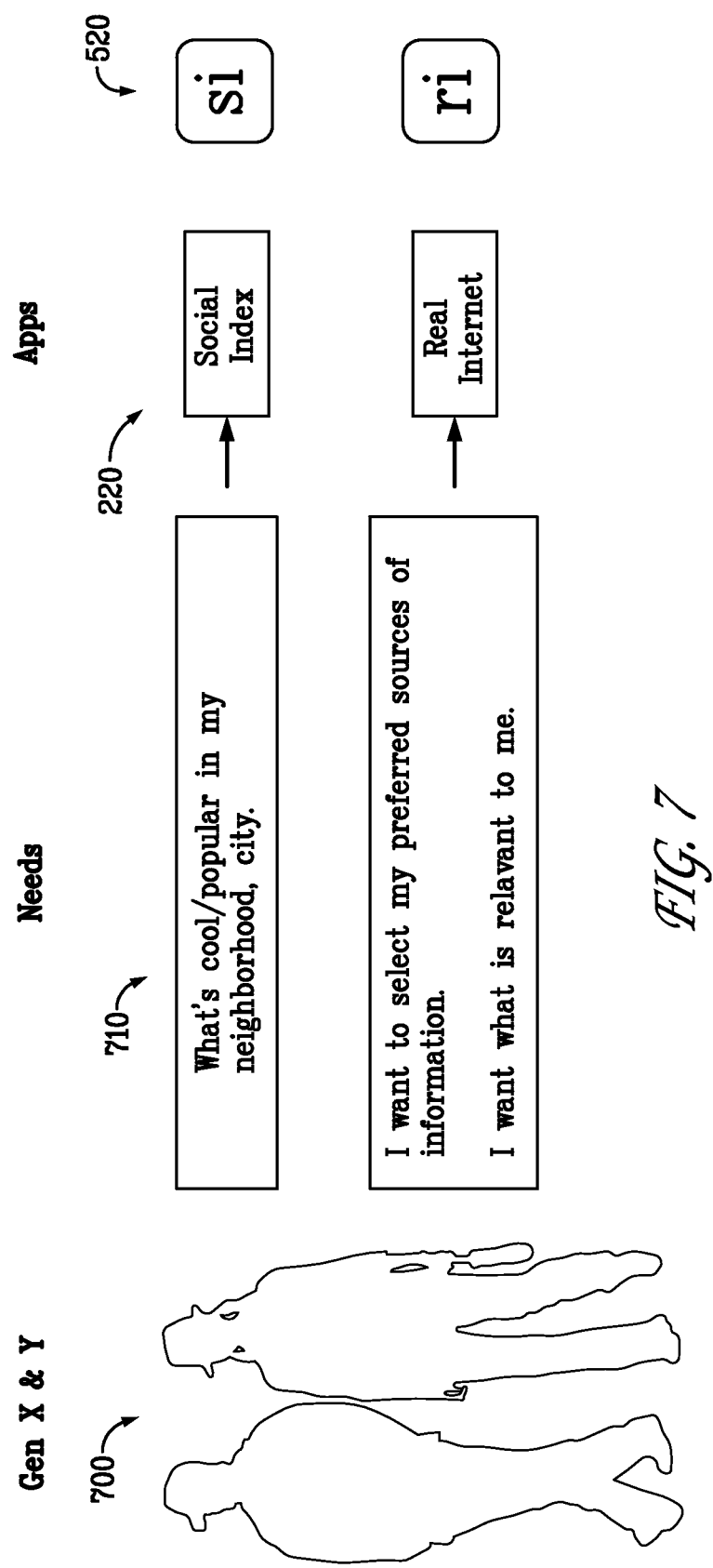
FIG. 7 illustrates representative policy applications that may be suited to members of generations X and Y.

FIG. 7 shows that still different social groups, members of generations X and Y 700 may have yet another set of needs 710 that may be addressed by different ones of the policy applications 220. As suggested in FIG. 7, generation X and Y members 700 may choose policy applications 220 that lead them to social events of interest. Regardless of the specific social group of the user 160, the selective use of the policy applications 220 gives the user 160 focused web search results that are relevant to the user 160.

Figure 8:
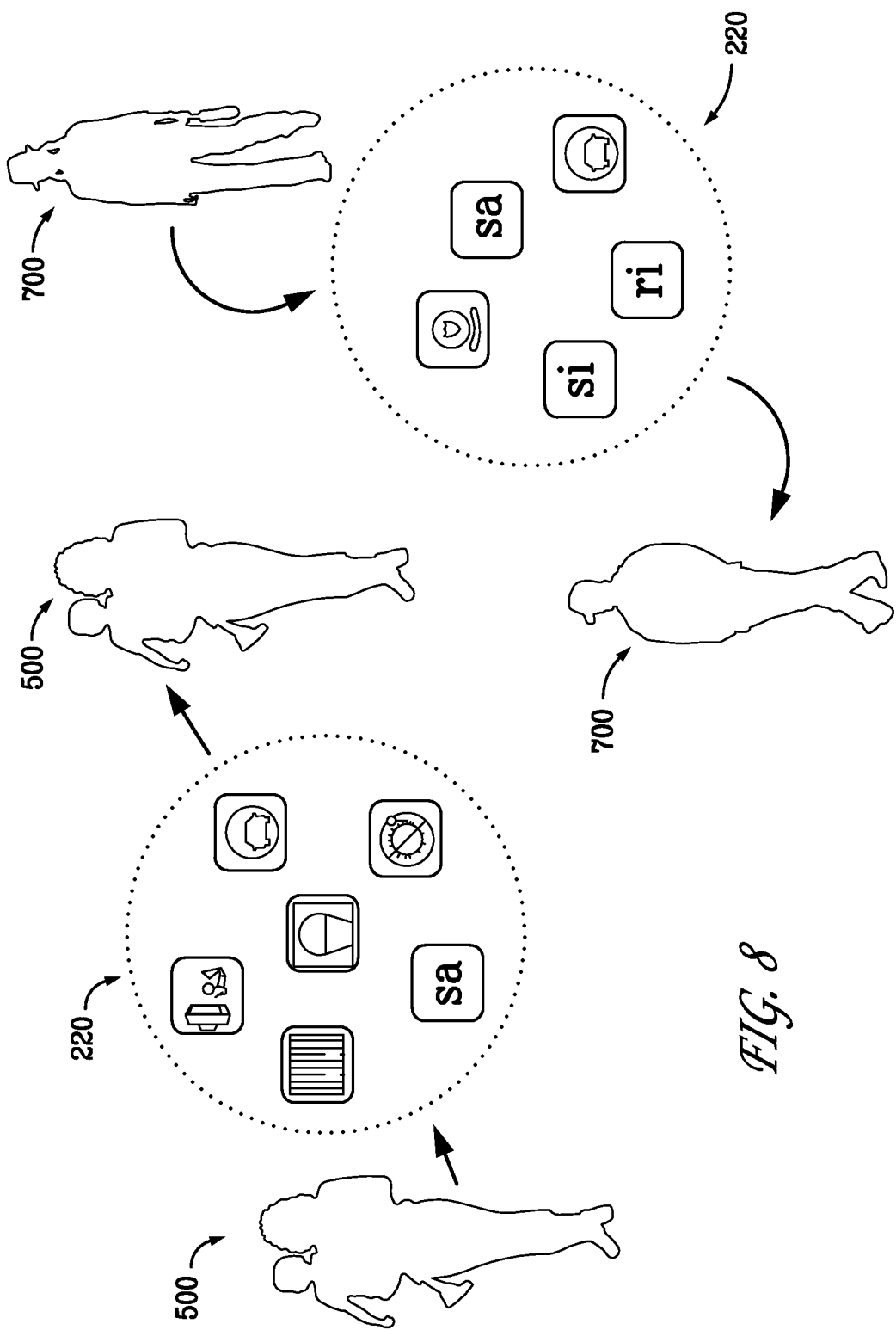
FIG. 8 is a representation of how personalization information may be shared among users of the system.

FIG. 8 illustrates the sharing of policy information among users of the system.

FIGS. 9-12 show various examples of presenting policy applications to the users of the system.

The embodiments described herein are illustrative of the present invention. As these embodiments of the present invention are described with reference to illustrations, various modifications or adaptations of the methods and or specific structures described may become apparent to those skilled in the art in light of the descriptions and illustrations herein. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of providing an individualized Internet service, the method comprising:
    establishing a user interface between an end user and an Internet service provider;
    utilizing a DNS server, upon which the method is operated;
    providing one or more discrete policy applications for a group of end users having a common interest, the policy applications mediating at least a portion of an Internet service received by the group of end users through at least one access device; the end user selecting via the user interface at least one of the policy applications to apply to the Internet service received by the group of end users through the at least one access device, in which selecting at least one of the policy applications includes providing a selection menu to the end user, the selection menu listing a plurality of available policy applications; and
    applying policies contained in the selected policy applications to the Internet service received by the group of end users through the at least one access device.

2. The method of claim 1, wherein the policy applications are separately configurable in combinations selected by the end user.

3. The method of claim 1, wherein applying the selected applications includes blocking at least a portion of a resolution performed by the DNS server.

4. The method of claim 1, wherein applying the selected policy applications includes redirecting at least a portion of a resolution performed by the DNS server.

5. The method of claim 1, wherein applying the selected policy applications includes logging and reporting resolutions performed by the DNS server.

6. The method of claim 1, wherein providing policy applications includes providing discrete separately configurable policy applications.

7. The method of claim 1, wherein the policy applications selected by the end user are shared or published at the discretion of the end user.

8. The method of claim 1, wherein applying the selected policy applications includes blocking at least a portion of the Internet service from all available end user interfaces.

9. The method of claim 1, further comprising receiving feedback relative to characteristics of the Internet service.

10. The method of claim 9, wherein receiving feedback includes receiving a list of sites that are accessed, access attempts for sites that are blocked, duration and time of use of each site, and which access device was used to access each site.

11. The method of claim 9, wherein receiving feedback includes receiving identification of each site accessing end user.

12. The method of claim 1, wherein mediating the Internet service includes any of blocking, constraining, enabling, redirecting, promoting, demoting, substituting, obscuring, limiting, interrupting, and restricting the Internet service.

13. The method of claim 1, further comprising transmitting site access information to third parties.

14. The method of claim 1, further comprising receiving site access information from third parties.

15. The method of claim 1, further comprising controlling the method via a user interface accessed through a gateway available to the end user.

16. The method of claim 1, further comprising controlling the method via remote control.

17. A method of providing individualized Internet service, the method comprising:
    establishing a user interface between an end user and a DNS network;
    utilizing a DNS server, upon which the method is operated;
    providing a set of discrete policy applications, the policy applications mediating at least a portion of an Internet service received by a group of end users through at least one access device, the group of end users having a common interest; the end user selecting via the user interface at least one of the policy applications to apply to the Internet service, policies contained in the policy applications being configurable in a combination selected by the end user and applicable to at least one access device used by the group of end users, in which selecting at least one of the policy applications includes providing a selection menu to the end user, the selection menu listing a plurality of available policy applications; and
    applying the selected policy applications to the Internet service received by the group of end users, so that the policy applications affect DNS server commands and actions.

18. The method of claim 17, wherein the policy applications are separately configurable in combinations selected by the end user.

19. The method of claim 17, wherein applying the selected policy applications includes blocking at least a portion of a resolution performed by an Internet Service provider.

20. The method of claim 17, wherein applying the selected policy applications includes blocking at least a portion of a resolution performed by an Internet Service provider.

21. The method of claim 17, wherein applying the selected policy applications includes logging and reporting resolutions performed by an Internet service provider.

22. The method of claim 17, wherein providing policy applications includes providing discrete separately configurable policy applications.

23. The method of claim 17, wherein the policy applications selected by the end user are shared or published at the discretion of the end user.

24. The method of claim 17, wherein applying the selected policy applications includes blocking at least a portion of the Internet service from all available end user interfaces.

25. The method of claim 17, further comprising receiving feedback relative to characteristics of the Internet service.

26. The method of claim 25, wherein receiving feedback includes receiving a list of sites that are accessed, access attempts for sites that are blocked, duration and time of use of each site, and which access device was used to access each site.

27. The method of claim 25, wherein receiving feedback includes receiving identification of each site accessing end user.

28. The method of claim 17, wherein mediating the Internet service includes any of blocking, constraining, enabling, redirecting, promoting, demoting, substituting, obscuring, limiting, interrupting, and restricting the Internet service.

29. The method of claim 17, further comprising transmitting site access information to third parties.

30. The method of claim 17, further comprising receiving site access information from third parties.

31. The method of claim 17, further comprising controlling the method via a gateway.

32. The method of claim 17, further comprising controlling the method via remote control.

33. A system for providing individualized Internet control, the system comprising:
   a user interface between at least one end user and an Internet service provider;
   a memory device with one or more discrete policy applications stored therein;
   a subscriber database that retains a policy configuration chosen by the at least one end user, the policy configuration being established by a combination of discrete policy applications selected by the at least one end user to apply to at least one access device; and
   a dynamic enforcement engine that applies policy settings, the dynamic enforcement engine residing on a DNS server, the dynamic enforcement engine in communication with the Internet Service Provider; the system being configured to allow the at least one end user to select via the user interface at least one of the policy applications to apply to an Internet service received by the at least one end user, and to apply the selected policy applications to the Internet service received through the at least one access device of the at least one end user, the at least one end user having a common interest, in which selecting at least one of the policy applications includes providing a selection menu to the at least one end user, the selection menu listing a plurality of available policy applications.

34. The system of claim 33, wherein the policy applications are cloud based applications.

35. The system of claim 33, wherein the subscriber database is shared between the DNS server and cloud based applications.

36. The system of claim 33, wherein the system is cloud based.

37. The system of claim 33, wherein at least one policy application is a discrete application.

38. The system of claim 33, wherein the policy applications are separately configurable.

39. The system of claim 33, wherein applying the selected policy applications includes mediating at least a portion of the Internet service from all available end user interfaces.

40. The system of claim 33, wherein the end user receives feedback relative to characteristics of the Internet service, the feedback including at least a list of sites that are accessed and to which access is blocked, duration and time of use of each site, and which end user interface was used to access each site.

41. The system of claim 40, wherein the feedback includes identification of each end user.

42. The system of claim 33, wherein site access information is transmitted to third parties.

43. The system of claim 33, wherein site access information is received from third parties.

44. The system of claim 33, wherein the system is controlled by a user interface accessed through a gateway available to the end user.

45. The system of claim 33, wherein the system is controlled by a remote control device.

46. The system of claim 45, wherein the remote control device is a Smartphone.

47. A non-transitory computer-readable storage medium having embodied thereon a program, the program executable by a processor to perform a method for controlling Internet content, the method comprising:
   providing one or more discrete policy applications that mediate at least a portion of an Internet service received by a group of end users through at least one access device;
   utilizing a DNS server, upon which the method is operated;
   selecting via a user interface at least one of the policy applications to apply to the Internet service received by the group of end users through the at least one access device, the group of end users having a common interest, in which selecting at least one of the policy applications includes providing a selection menu to the group of end users, the selection menu listing a plurality of available policy applications; and
   applying the selected policy applications to the Internet service received by the group of end users through the at least one access device.

* * * * *